(12) United States Patent
Pawson et al.

(10) Patent No.: US 8,380,223 B2
(45) Date of Patent: Feb. 19, 2013

(54) SYSTEM AND METHOD FOR PROVIDING CENTRALIZED POSITIONING DETERMINATION FOR MULTIPLE RADIO ACCESS NETWORKS

(75) Inventors: Darren Pawson, Mt. Warrigal (AU); Nguyen Khiem Tran, Sutherland (AU)

(73) Assignee: Andrew LLC, Hickory, NC (US)

( * ) Notice: Subject to any disclaimer, the term of this patent is extended or adjusted under 35 U.S.C. 154(b) by 453 days.

(21) Appl. No.: 12/560,662

(22) Filed: Sep. 16, 2009

(65) Prior Publication Data

US 2011/0065454 A1   Mar. 17, 2011

(51) Int. Cl.
*H04W 24/00*   (2009.01)

(52) U.S. Cl. ............ 455/456.2; 370/328; 455/436; 455/456.3; 455/456.6

(58) Field of Classification Search ........... 455/404.2, 455/412.1, 415, 422.1, 433, 435.1, 440, 456.1, 455/456.2, 456.3; 707/705, 706, 713, 728, 707/729, 731, 736, 737, 740, 741, 752, 754, 707/758, 763, 770, 830; 370/328, 331
See application file for complete search history.

(56) References Cited

U.S. PATENT DOCUMENTS

| | | | |
|---|---|---|---|
| 5,551,024 A * | 8/1996 | Waters | 1/1 |
| 5,586,175 A * | 12/1996 | Hogan et al. | 379/114.14 |
| 2006/0293066 A1 | 12/2006 | Edge et al. | |
| 2009/0003263 A1* | 1/2009 | Foster et al. | 370/328 |
| 2009/0104917 A1 | 4/2009 | Rached et al. | |
| 2009/0170528 A1 | 7/2009 | Bull et al. | |
| 2010/0093376 A1* | 4/2010 | del Castillo et al. | 455/456.6 |

\* cited by examiner

*Primary Examiner* — Wesley Kim
*Assistant Examiner* — Dinh P Nguyen
(74) *Attorney, Agent, or Firm* — Volentine & Whitt, PLLC

(57) ABSTRACT

An apparatus and method are provided for processing requests by a stand-alone serving mobile location center (SAS), shared by multiple radio access networks in a wireless network, for determining locations of mobile devices within the wireless network. A positioning request message for a mobile device is received from a radio network controller (RNC) in a radio access network (RAN) of the multiple radio access networks. An originating point code (OPC) and a cell identifier are retrieved from the positioning request message. A mobile country code (MCC) and a mobile network code (MNC) corresponding to the RAN are determined based on the retrieved OPC. A serving network node communicating with the mobile device is identified using the cell identifier and the determined MCC and MNC.

20 Claims, 5 Drawing Sheets

SYSTEM AND METHOD FOR PROVIDING CENTRALIZED POSITIONING DETERMINATION FOR MULTIPLE RADIO ACCESS NETWORKS

BACKGROUND AND SUMMARY

Wireless communications are enabled by various types of networks, including Universal Mobile Telecommunication System (UMTS) networks and Global System for Mobile communications (GSM) networks, for example. The various types of wireless communications networks include multiple base stations, referred to as Node Bs in UMTS networks, for exchanging communications with mobile devices operating within corresponding cells. The base stations or Node Bs are connected to a controller, such as a base station controller (BSC) or radio network controller (RNC), which is in turn connected to a Mobile Switching Center (MSC) within the core network. Also within the core network is a Gateway Mobile Location Center (GMLC), which is the first access point of location requests from external clients.

Conventional wireless communication services may include the feature of determining geographic positions or locations of mobile devices. For example, an emergency service responsive to "911" initiated at a mobile device may include estimating latitude and longitude of the mobile device in order to locate the device, which is particularly important when a distressed caller is otherwise unable to provide their present position. Geographic location of mobile devices may be determined by a location determination server in the wireless communication network, such as a serving mobile location center (SMLC), connected to base stations through a BSC in a GSM network, or a stand-alone SMLC (SAS) connected to Node Bs through an RNC of a UMTS network. The location determination server may determine the geographic location of a mobile device operating within the wireless communication network using positioning measurements from a global navigation satellite system (GNSS) provided by the mobile device or by using other network-oriented measurements (such as signal strength, arrival time, timing advance, etc).

A wireless communications network may include multiple access networks, each of which typically corresponds to a different carrier or network service provider. Accordingly, each access network providing geographic location determination services in a UMTS network, for example, includes an SAS dedicated to that access network. Currently communications standards, such as the Positioning Calculation Application Part (PCAP), incorporate this configuration, and thus limited information identifying network nodes involved in the location determination process is provided to the SAS, since it is anticipated that the network nodes are all in the same access network. Therefore, the SAS cannot service multiple access networks under conventional standards and implementations.

In a representative embodiment, a method is provided for processing requests by a stand-alone serving mobile location center (SAS), shared by multiple radio access networks in a wireless network, for determining locations of mobile devices within the wireless network. A positioning request message for a mobile device is received from a first radio network controller in a first radio access network of the multiple radio access networks. An originating point code (OPC) and a cell identifier are retrieved from the positioning request message. A mobile country code (MCC) and a mobile network code (MNC) corresponding to the first radio access network are determined based on the retrieved OPC. A serving network node communicating with the mobile device is identified using the cell identifier and the determined MCC and MNC.

In another representative embodiment, an apparatus is provided for processing requests to determine locations of mobile devices in a wireless network, the apparatus being shared by multiple radio access networks of the wireless network. The apparatus includes an interface module, a retrieval module, a determination module and a node identification module. The interface module is configured to receive a first positioning request message for a first mobile device from a first radio network controller in a first radio access network and to receive a second positioning request message for a second mobile device from a second radio network controller in a second radio access network. The retrieval module is configured to retrieve a first OPC and a first cell identifier from the first positioning request message. The determination module is configured to determine a first MCC and a first MNC corresponding to the first radio network based on the first retrieved OPC. The node identification module is configured to identify a first network node serving the first mobile device based on the first cell identifier and the first determined MCC and MNC.

In another representative embodiment, a computer readable medium is provided for storing code executable by a computer processor for processing requests by an SAS, shared by multiple radio access networks in a wireless network, to determine locations of mobile devices within the wireless network. The computer readable medium includes a retrieving code segment for retrieving an OPC and a cell identifier from a positioning request message received from a first radio network controller in a first radio access network of the multiple radio access networks, the positioning request message corresponding to a mobile device. The computer readable medium also includes a determining code segment for determining an MCC and an MNC corresponding to the first radio access network based on the retrieved OPC, and an identifying code segment for identifying a serving network node communicating with the mobile device using the cell identifier and the determined MCC and MNC.

BRIEF DESCRIPTION OF THE DRAWINGS

The illustrative embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

In the following detailed description, for purposes of explanation and not limitation, illustrative embodiments disclosing specific details are set forth in order to provide a thorough understanding of embodiments according to the present teachings. However, it will be apparent to one having had the benefit of the present disclosure that other embodiments according to the present teachings that depart from the specific details disclosed herein remain within the scope of the appended claims. Moreover, descriptions of well-known devices and methods may be omitted so as not to obscure the description of the example embodiments. Such methods and devices are within the scope of the present teachings.

In various embodiments, a single SAS is configured to determine geographic locations of mobile devices for multiple radio access networks (RANs), each of which includes one or more radio network controllers (RNC), using conventional messaging. Generally, the SAS receives a positioning request message for determining the geographic location of a mobile device (referred to as the "target mobile device") from an RNC in one of the RANs. The positioning request message includes identification information with respect to the RNC and the Node B serving the target mobile device, but because of the presence of multiple RANs, the identification information is insufficient for the SAS to uniquely identify reliably the RNC and the Node B (or cell) serving the target mobile device.

Therefore, as discussed below, the SAS retrieves identification information unique to the RNC sending the positioning request message, such as an originating point code (OPC) of the positioning request message, and determines additional information for identifying the RAN in which the RNC and Node B are located, such as a corresponding mobile country code (MCC) and a mobile network code (MNC). For example, the SAS may determine the additional information from a previously populated database relating such additional information with OPCs and/or ranges of OPCs. The SAS is then able to identify the RNC and serving Node B of the target mobile device using the determined MCC and MNC, in conjunction with other information retrieved from the positioning request message.

Figure 1:
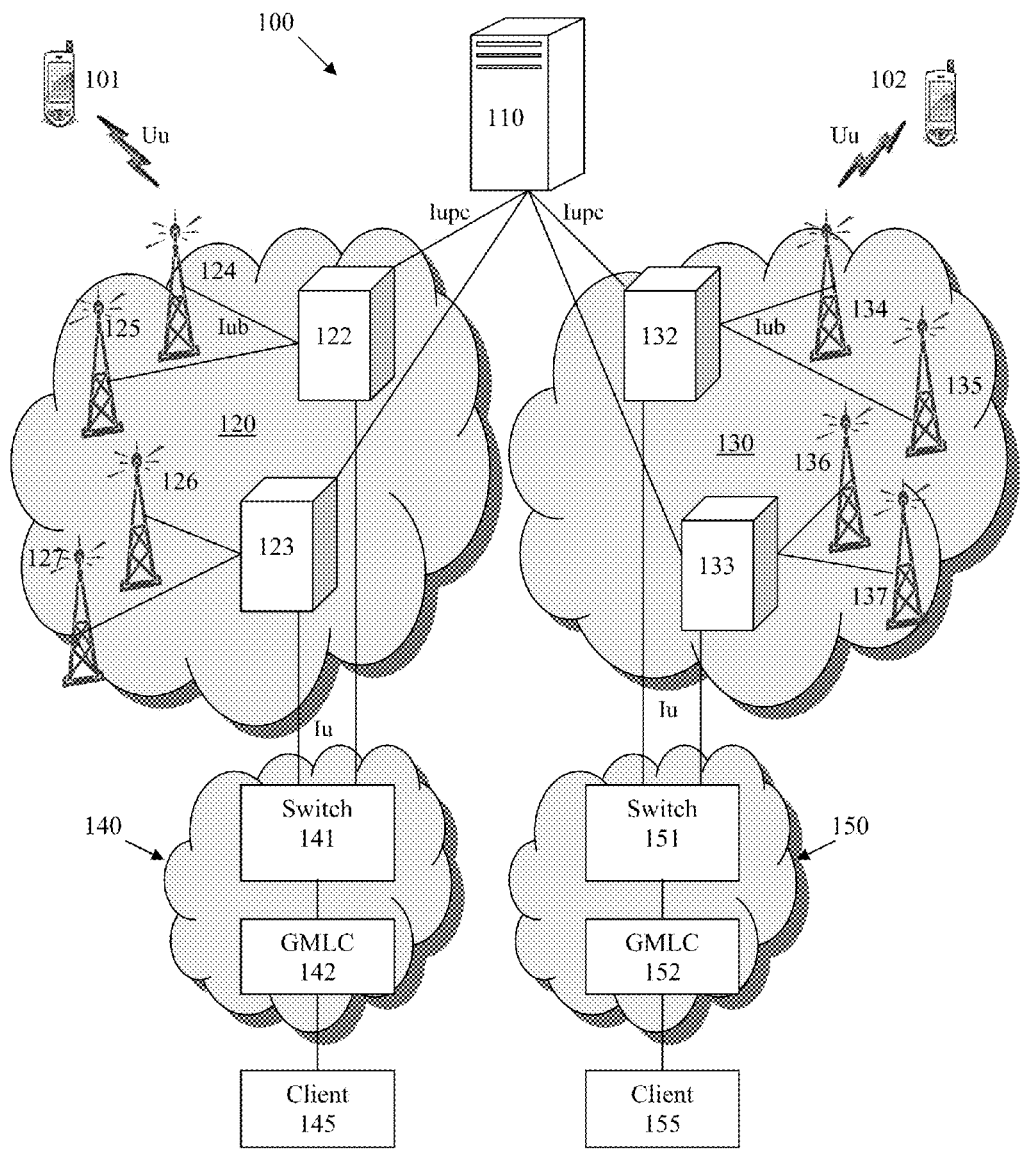
FIG. 1 is a functional block diagram illustrating a system for locating mobile devices in a wireless communication network, according to a representative embodiment.

FIG. 1 is a functional block diagram illustrating a system for locating a mobile device in a wireless communication network, according to a representative embodiment. In particular, the embodiment of FIG. 1 shows telecommunications system 100, which includes multiple RANs, indicated by representative RAN 120 and RAN 130, each of which may be a Universal Terrestrial Radio Access Network (UTRAN) in a UMTS network, for example. The RANs 120 and 130 access a common location determination server or SAS 110 in response to requests for determining geographic locations of mobile devices, such as representative mobile devices 101 and 102, discussed below. The mobile devices 101 and 102 may be any type of wireless device configured for communicating through the RANs 120 and 130, including cellular telephones, laptop computers, personal digital assistants (PDAs), gaming devices, or the like. The mobile devices 101 and 102 communicate with the RANs 120 and 130 using Uu interfaces. The telecommunications system 100 also includes representative core networks 140 and 150, each of which traditionally belongs to the network provider that also provides the RAN. The client, indicated by clients 145 and 155 in FIG. 1, represents a service, application or subscriber, for example, wishing to use the network to carry out a location request for a target mobile device.

In FIG. 1, RAN 120 may include one or more RNCs, indicated by representative RNC 122 and RNC 123. RNC 122 controls base stations or Node Bs 124 and 125, and RNC 123 controls base stations or Node Bs 126 and 127, for example, using Iub interfaces. Each of the Node Bs 124-127 corresponds to a wireless cell in RAN 120. RAN 130 may similarly include one or more RNCs, indicated by representative RNC 132 and RNC 133. RNC 132 controls base stations or Node Bs 134 and 135, and RNC 133 controls base stations or Node Bs 136 and 137, for example, using Iub interfaces. Each of the Node Bs 134-137 corresponds to a wireless cell in RAN 130. Each RNC (e.g., RNC 122 of RAN 120) and associated Node Bs (e.g., Node Bs 124 and 125) constitute a radio network subsystem (RNS). Accordingly, in the depicted illustrative embodiment, RAN 120 and RAN 130 each include two RNSs, each of which includes an RNC and two Node Bs.

The RNCs 122-123 of RAN 120 and the RNCs 132-133 of RAN 130 are connected to the common SAS 110 via Iupc interfaces, for example. In this configuration, a single SAS 110 is able to implement location determination services for multiple RANs by identifying the RANs 120 and 130 and/or the RNCs 122-123 and 132-133 initiating positioning request messages. According to various embodiments, the SAS 110 identifies the RANs 120 and 130 and/or the RNCs 122-123 and 132-133 using previously stored additional identification information not otherwise provided in positioning request messages, as discussed below with reference to FIGS. 2 and 3. Although the embodiment of FIG. 1 depicts a UMTS network, including SAS 110, RNCs 122-124 and 132-133, and Node Bs 124-127 and 134-137, for example, it is understood that other types of networks and location determination servers may be incorporated without departing from the scope of the present teachings.

As shown in FIG. 1, the RNCs 122-123 are selectively connected to Gateway Mobile Location Center (GMLC) 142 in the corresponding core network 140 through switch 141, and RNCs 132-133 are selectively connected to GMLC 152 in the corresponding core network 150 through switch 151. For example, each of the switches 141 and 142 may be a Mobile Switching Center (MSC) in a circuit switching network, or a serving GPRS support node (SGSN) in a packet switching network. The RNCs 122-123 and RNCs 132-133 communicate with the switches 141 and 151 via Iu interfaces, respectively. The GMLCs 142 and 152 are platforms for interfacing the clients 145 and 155 with the RANs 120 and 130, respectively, to initiate location determination services, e.g., with respect to mobile devices 101 and 102. Each of the GMLCs 142 and 152 may be connected to a home location register (HLR) (not shown) or other database that includes subscriber and routing information with respect to the mobile devices 101 and 102, respectively.

The SAS 110 may be configured to implement any of various types of location determination services without departing from the scope of the present teachings. For example, the location determination service may use satellite and/or terrestrial positioning systems to determine the location of mobile devices 101 and 102 based on satellite measurements, terrestrial measurements or combinations thereof for position calculation, which may include trilateration techniques. Satellite positioning systems, such as GNSS networks, may be any system configured to provide geographic locations of receivers, e.g., housed in the mobile devices 101 and 102, using a constellation of satellites, such as the Global Positioning System (GPS), Global Navigation Satellite System (GLONASS), Galileo and COMPASS Navigation Satellite System (BeiDou), and the like. Terrestrial positioning systems may be based on any type of range measurements, e.g., performed by LMUs, which may or may not be collocated with Node Bs 124-127 and 134-137, such as round-trip time (RTT) measurements (e.g., in a UMTS network), uplink-time difference of arrival (U-TDOA) or timing advance (TA) measurements (e.g., in a GSM network), enhanced observed time difference (E-OTD) measurements, angle of arrival (AoA) measurements, power of arrival (POA) measurements, WiFi measurements, DTV signals and the like.

Figure 2:
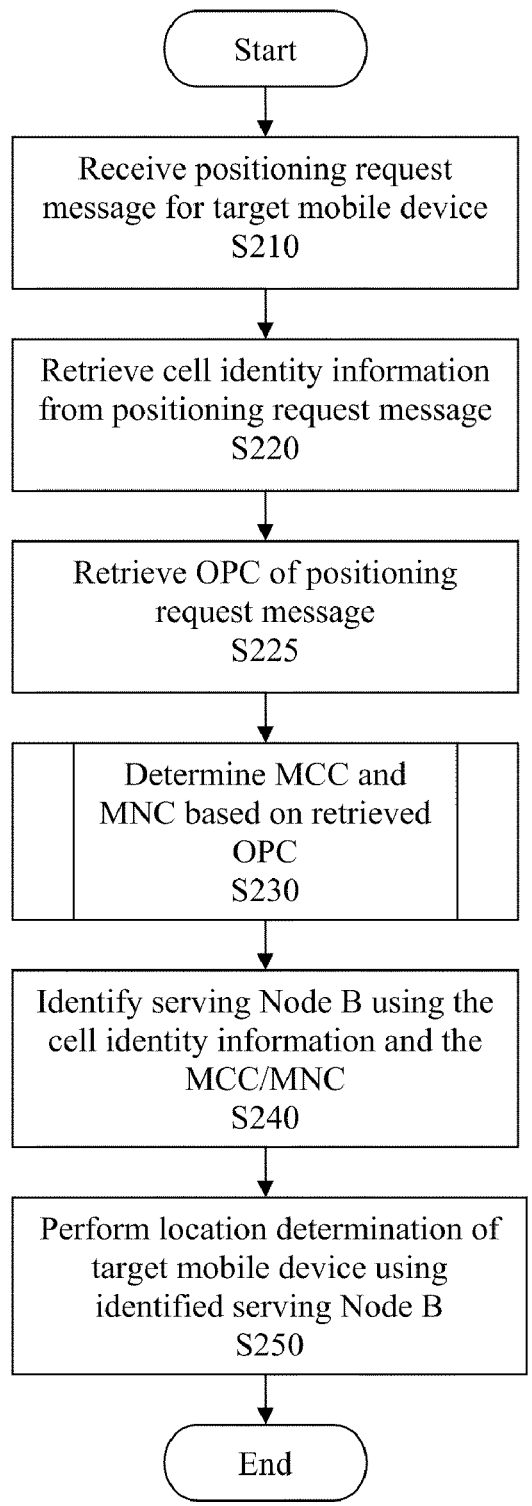
FIG. 2 is a flowchart illustrating a method for identifying cells within radio access networks for locating mobile devices, according to a representative embodiment.

FIG. 2 is a flowchart illustrating a method for identifying cells within radio access networks for locating mobile devices, according to a representative embodiment. The process of FIG. 2 may be executed, for example, by a common location determination server, such as SAS 110 depicted in FIG. 1.

Referring to FIG. 2, the process begins at step S210 by receipt of a positioning request message for determining the geographic location of a target mobile device. In an embodiment, the positioning request message is a PCAP formatted message for SAS positioning procedures, as set forth, for example, in 3GPP TS 25.453, "UTRAN Iupc Interface Positioning Calculation Application Part (PCAP) Signaling," the contents of which is hereby incorporated by reference. The positioning request message is received by the SAS 110, for example, from the RNC corresponding to the Node B serving the target mobile device. For example, the SAS 110 would receive a positioning request message from RNC 122 via the respective Iupc interface to implement a geographic location determination process with respect to mobile device 101, where mobile device 101 is communicating with Node B 124.

The positioning request message may be populated and sent by the RNC in response to a request to determine geographic location of the target mobile device initiated by any of a variety of sources, without departing from the scope of the present teachings. For example, the switch 141 may receive a message from the mobile device 101 through Node B 124 and RNC 122 requesting determination of the geographic location of the mobile device 101. The message may be initially transmitted over voice/data communication channels and/or signaling channels of the RAN 120. Alternatively, the switch 141 may receive a message from the client 145 through GMLC 142 requesting determination of the geographic location of the mobile device 101. Regardless of the initiating source, the RNC 122 ultimately formulates an appropriate positioning request message to send to the SAS 110, as discussed above.

At step S220 of FIG. 2, information is retrieved or extracted from the positioning request message, partially identifying the Node B and/or the RNC controlling the Node B in communication with the target mobile device. The extracted information may include cell identity information corresponding to the RNC and the serving Node B. For example, a PCAP message includes a UTRAN Cell Identity (UC-Id) parameter, which provides RNCId and CellId of the corresponding RNC and serving Node B, respectively. However, unlike a standard Cell Global Identity (CGI), for example, the UC-Id parameter does not include the MCC or MNC corresponding to the RAN and/or RNC. The MCC and MNC would not be needed if the SAS 110 were dedicated to a single RAN. However, because the SAS 110 according to various embodiments services multiple RANs (e.g., RANs 120 and 130), the SAS 110 is not able to uniquely identify the RNC or serving Node B based only on the RNCId and CellId.

Accordingly, at step S225, additional identification information, such as the originating point code (OPC) of the RNC that sent the positioning request message, is retrieved to particularly identify the RAN and/or RNC. For example, the OPC may be retrieved from the call control signaling, such as signaling system 7 (SS7) signaling, associated with the positioning request message. Of course, other types of cell identity information and/or call signaling parameters capable of uniquely identifying the RAN and/or RNC of the target mobile device may be used without departing from the scope of the present teachings.

Step S230 indicates a process according to which the information extracted from the positioning request message is used to retrieve additional identification information, such as the MCC and the MNC corresponding to the RAN and/or RNC, or other unique identifying information. The additional identification information may be retrieved from a previously populated memory or database, in which the additional identification information has been stored in relation to the information extracted from the positioning request message. For example, a previously established database may map each available OPC or ranges of available OPCs of the RNCs in each RAN with a corresponding MCC and MNC.

Figure 3:
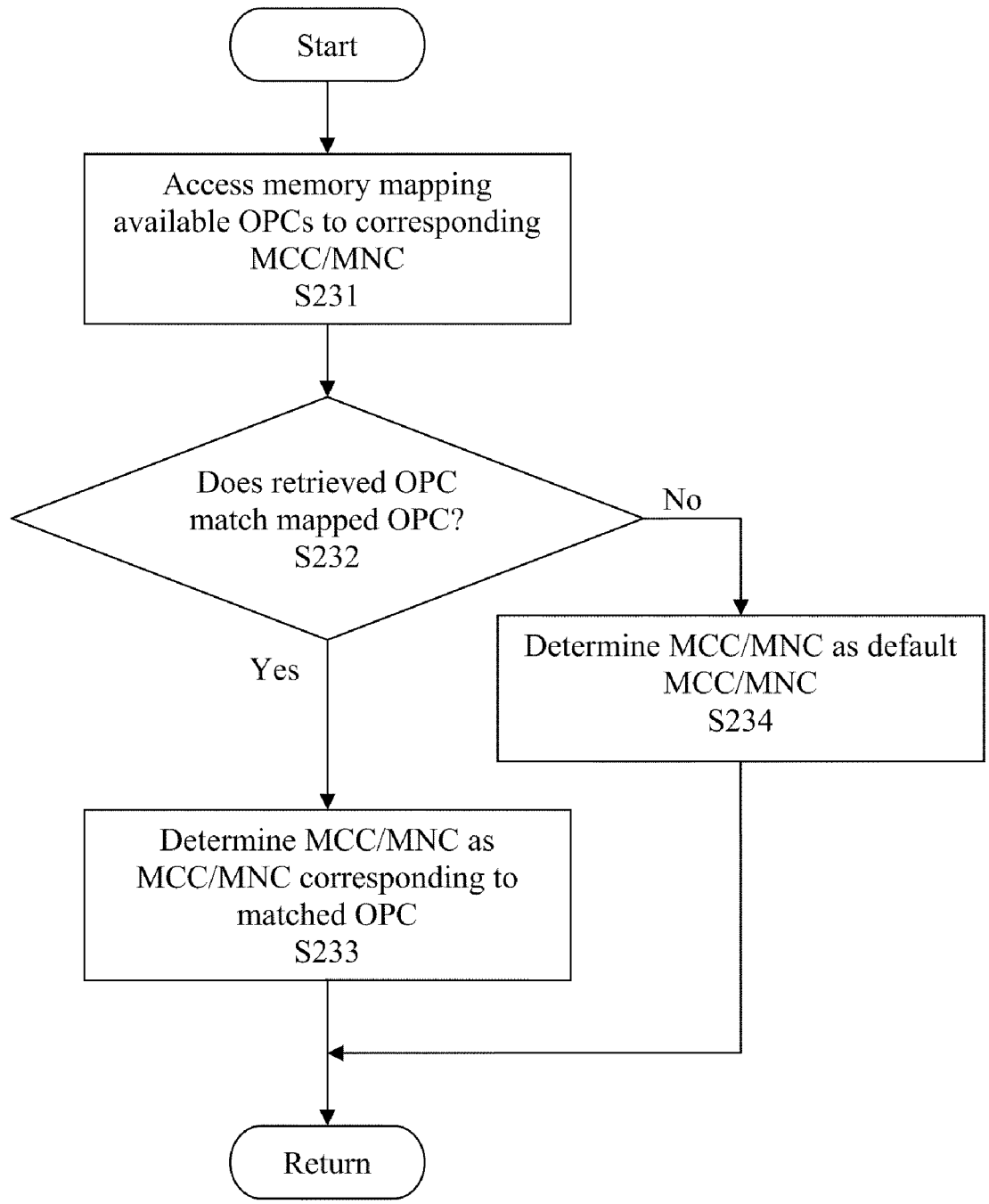
FIG. 3 is a flowchart illustrating a process included in the method for identifying cells within radio access networks for locating mobile devices, according to a representative embodiment.

FIG. 3 is a flowchart illustrating the process indicated by step S230 in detail, according to a representative embodiment. Referring to FIG. 3, the previously established database or other type of memory mapping the available OPCs or OPC ranges to corresponding MCCs/MNCs is accessed at step S231. At step S232, it is determined whether the OPC retrieved from the SS7 signaling of the positioning request message matches one of the available OPCs or otherwise falls within a range of available OPCs. For example, in an embodiment, multiple ranges of available OPCs may be established, each containing a low-OPC value and a high-OPC value, where retrieved OPCs that fall within the low- and high-OPC values (inclusive) are matched with that range.

When the retrieved OPC matches an available OPC or OPC range (step S232: Yes), the MCC/MNC corresponding to the RAN and/or RNC is determined to be the MCC/MNC to which the matched OPC or OPC range is mapped at step S233. When the retrieved OPC does not match an available OPC or OPC range (step S232: No), the MCC/MNC corresponding to the RAN and/or RNC is determined to be a default MCC/MNC at step S234.

Referring again to FIG. 2, the MCC/MNC determined by the process indicated at step S230 and described above with reference to FIG. 3 is included with the extracted cell identity information (e.g., the UC-Id parameter), effectively creating a globally unique CGI to specifically identify the Node B and thus the corresponding cell serving the target mobile device at step S240. For example, the MCC/MNC enables identification of the RAN in which the serving Node B is located and/or the RNC that controls the serving Node B. This information is sufficiently unique to identify the serving Node B cell. For example, once the RAN is known (e.g., based on the determined MCC and/or MNC), the RNC may be identified using the RNCId and the serving Node B may be identified using the CellId from the UC-Id parameter.

Once the serving Node B is identified, the SAS 110 is able to determine pertinent characteristics of the serving Node B, such as latitude and longitude, altitude, cell range, antenna parameters, and the like. Such information may be retrieved from a previously populated database of Node Bs, for example. Thus, at step S250, the geographic location determination process is performed, e.g., by the SAS 110, with respect to the target mobile device based on the identified serving Node B or corresponding cell. Identifying the geographic location of the serving cell is necessary in most mobile location positioning methods, including GNSS systems, where rough location knowledge is required to generate assistance data specific to the mobile device's location.

Figure 4:
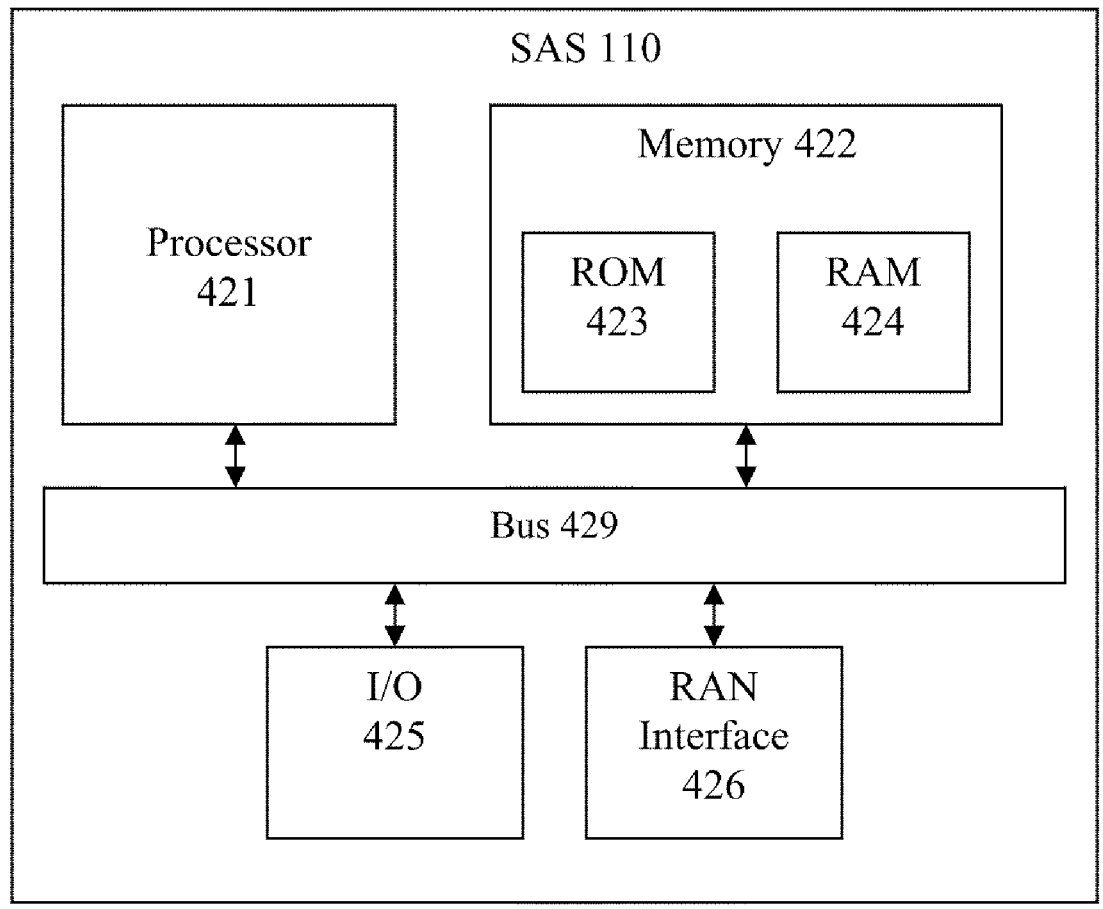
FIG. 4 is a functional block diagram illustrating a device for locating a mobile device in a wireless communication network, according to a representative embodiment.

FIG. 4 is a functional block diagram illustrating SAS 110 that executes a process for identifying cells within radio access networks for locating mobile devices, according to a representative embodiment. Although the SAS 110 is shown and discussed in detail, it is understood that other servers in the system 100 of FIG. 1 may be configured in a similar manner as the SAS 110, at least with respect to processing and storage functionality.

The various "parts" shown in the SAS 110 may be physically implemented using a software-controlled microprocessor, e.g., processor 421, hard-wired logic circuits, firmware, or a combination thereof. Also, while the parts are functionally segregated in the SAS 110 for explanation purposes, they may be combined variously in any physical implementation.

In the depicted embodiment, the SAS 110 includes processor 421, memory 422, bus 429 and various interfaces 425-426. The processor 421 is configured to execute one or more logical or mathematical algorithms, including the cell identification process of the embodiments described herein, in conjunction with the memory 422, as well as basic functionality for executing and/or controlling geographic location determination processes for locating mobile devices. The processor 421 may be constructed of any combination of hardware, firmware or software architectures, and include its own memory (e.g., nonvolatile memory) for storing executable software/firmware executable code that allows it to perform the various functions. Alternatively, the executable code may be stored in designated memory locations within memory 422, discussed below. In an embodiment, the processor 421 may be a central processing unit (CPU), for example, executing an operating system, such as Windows operating systems available from Microsoft Corporation, NetWare operating system available from Novell, Inc., or Unix operating system available from Sun Microsystems, Inc. The operating system controls execution of other programs of the SAS 110.

The memory 422 may be any number, type and combination of nonvolatile read only memory (ROM) 423 and volatile random access memory (RAM) 424, and stores various types of information, such as signals and/or computer programs and software algorithms executable by the processor 421 (and/or other components), e.g., to perform cell identification of the embodiments described herein, as well as the basic functionality of geographic location determination of mobile devices. As generally indicated by ROM 423 and RAM 424, the memory 422 may include any number, type and combination of tangible computer readable storage media, such as a disk drive, an electrically programmable read-only memory (EPROM), an electrically erasable and programmable read only memory (EEPROM), a CD, a DVD, a universal serial bus (USB) drive, and the like. Further, the memory 422 may store the predetermined associations between available OPCs and/or OPC ranges and corresponding MCCs/MNCs, as discussed above.

Further, as discussed above, messages are received from RNCs (e.g., RNCs 122-123 and 132-133) through RAN interface 426, and communicated to the processor 421 and/or the memory 422 via bus 429. In the depicted embodiment, the network interface 426 is an Iupc interface configured to receive messages from all RNCs of the various RANs, e.g., representative RANs 120 and 130 within the network 100. However, the number and arrangement of the network interfaces may vary without departing from the scope of the present teachings.

In an embodiment, a user and/or other computers may interact with the SAS 110 using various input device(s) through I/O interface 425. The input devices may include a keyboard, key pad, a track ball, a mouse, a touch pad or touch-sensitive display, and the like. Also, various information may be displayed on a display (not shown) through a display interface (not shown), which may include any type of graphical user interface (GUI).

Figure 5:
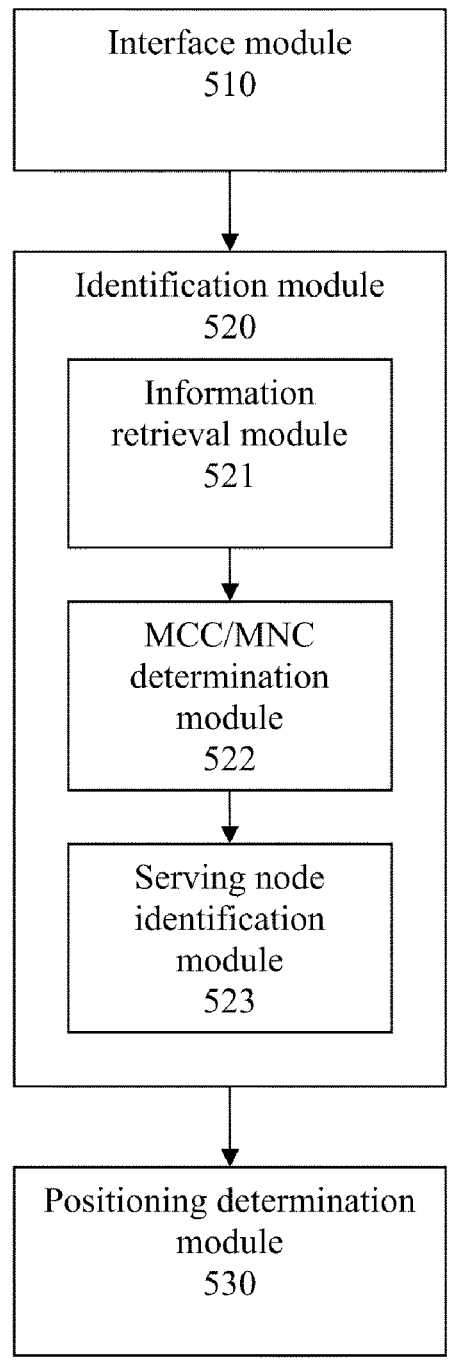
FIG. 5 is a block diagram showing processing modules executable by a device for identifying cells within radio access networks for locating mobile devices, according to a representative embodiment.

FIG. 5 is a block diagram showing processing modules executable by a device, such as a location determination server, for identifying cells within radio access networks for locating mobile devices, according to a representative embodiment. In the depicted embodiment, the processing modules include interface module 510, cell identification module 520 and positioning determination module 530, discussed below.

In various embodiments, the processing modules may be part of the SAS 110 and/or processor 421, for example. The modules may be implemented as any combination of software, hard-wired logic circuits ware and/or firmware configured to perform the designated operations. Software modules, in particular, may include source code written in any of a variety of computing languages, such as C++, C# or Java, and are stored on tangible computer readable storage media, such the computer readable storage media discussed above with respect to memory 422, for example.

The interface module 510 provides functionality to receive messages from other network nodes or devices, such as such as positioning request messages received from RNCs. For example, the interface module 510 may receive PCAP messages requesting determination of the geographic location of a target mobile device from the RNC controlling the Node B serving the target mobile device. The interface module may be configured as an Iupc interface.

The cell identification module 520 provides functionality to extract information parameters of the received messages and to determine additional identification information based on the extracted information parameters. In the depicted representative embodiment, the cell identification module 520 includes information retrieval module 521, MCC/MNC determination module 522 and serving node identification module 523.

The information retrieval module 521 provides functionality to retrieve identification information of the received positioning request message relating to the RNC that sent the positioning request message and the serving Node B. The retrieved information may include, for example, a UTRAN Cell Identity (UC-Id) parameter, which provides RNCId and CellId of the RNC and the serving Node B, respectively. Further, the information retrieval module 521 retrieves additional information to particularly identify the RAN and/or RNC, such as the OPC of the RNC that sent the positioning request message. The OPC may be retrieved from the SS7 call control signaling of the positioning request message, for example.

The MCC/MNC determination module 522 provides functionality to determine the MCC/MNC corresponding to RAN and/or RNC that sent the positioning request message. In an embodiment, the MCC/MNC determination module 522 accesses a previously established database or other type of memory that maps available OPCs and/or ranges of available OPCs, e.g., of RNCs in the RANs, to corresponding MCCs/MNCs. The OPC retrieved from the positioning request message is compared to the available OPCs to determine whether it matches one of the available OPCs or otherwise falls within a range of available OPCs. When the retrieved OPC matches an available OPC or OPC range, the MCC/MNC determination module 522 identifies the MCC/MNC corresponding to the matched available OPC or OPC range as the MCC/MNC of the RAN and/or RNC from which the positioning request message was received. When the retrieved OPC does not match an available OPC or OPC range, the MCC/MNC determination module 522 sets the MCC/MNC of the RAN and/or RNC from which the positioning request message was received to default values.

The serving node identification module 523 provides functionality to identify the cell in which the target mobile device is located by identifying the serving Node B using the retrieved and determined identification information, e.g., the UC-Id parameter, the MCC and the MNC. For example, serving node identification module 523 may identify the RAN in which the serving Node B of the target mobile device is located and/or the RNC that controls the serving Node B using the MCC/MNC determined by the MCC/MNC determination module 522. Once the RAN and/or RNC is known, the RNC may be identified using the RNCId and the serving Node B may be identified using the CellId from the UC-Id parameter.

The position determination module 530 provides functionality to determine geographic locations of target mobile devices, using any geographic location determination techniques, implemented by various satellite and/or terrestrial positioning systems. The geographic location determination techniques are implemented based on the identified cell provided by the cell identification module 520.

It is understood that the modules and corresponding functionalities shown in FIG. 5 are intended to depict one example of a representative embodiment. The identity and functionality of the modules may differ, without departing from the scope of the present teachings. It is further understood that the same functionality discussed with reference to FIG. 5 may be performed, all or in part, by any common location determination server, for example, without departing from the scope of the present teachings.

While specific embodiments are disclosed herein, many variations are possible, which remain within the concept and scope of the invention. Such variations would become clear after inspection of the specification, drawings and claims herein. The invention therefore is not to be restricted except within the scope of the appended claims.

What is claimed is:

1. A method of processing requests by a stand-alone serving mobile location center (SAS), shared by a plurality of radio access networks in a wireless network, for determining locations of mobile devices within the wireless network, the method comprising:
    receiving a positioning request message for a mobile device from a first radio network controller (RNC) in a first radio access network of the plurality of radio access networks, the positioning request message including an RNC identifier corresponding to the first RNC and a cell identifier corresponding to a serving network node communicating with the mobile device;
    retrieving an originating point code (OPC) corresponding to the first RNC and associated with the positioning request message, the OPC being unique to the first RNC among the plurality of radio access networks;
    determining a mobile country code (MCC) and a mobile network code (MNC) corresponding to the first radio access network based on the retrieved OPC; and
    identifying a serving network node communicating with the mobile device using the cell identifier and the determined MCC and MNC.

2. The method of claim 1, wherein determining the MCC and the MNC based on the retrieved OPC comprises:
    previously mapping a plurality of OPCs to corresponding MCCs and MNCs;
    matching the retrieved OPC to one of the plurality of mapped OPCs; and
    identifying the MCC and the MNC corresponding to the retrieved OPC based on the previous mapping of the matched one of the plurality of mapped OPCs.

3. The method of claim 2, wherein previously mapping the plurality of OPCs to corresponding MCCs and MNCs comprises:
    identifying a plurality of OPC ranges, each range comprising at least two of the plurality of OPCs, wherein each OPC range corresponds to an MCC and an MNC.

4. The method of claim 3, wherein identifying the MCC and the MNC corresponding to the retrieved OPC comprises:
    associating the matched one of the plurality of mapped OPCs with an OPC range of the plurality of OPC ranges.

5. The method of claim 2, further comprising:
    when the retrieved OPC cannot be matched to one of the plurality of mapped OPCs, identifying a default MCC and MNC as the determined MCC and MNC for identifying the network node.

6. The method of claim 1, wherein the positioning request message comprises a Positioning Calculation Application Part (PCAP) message.

7. The method of claim 1, wherein the OPC comprises a signaling system 7 (SS7) address corresponding to the first RNC.

8. The method of claim 1, wherein the wireless network comprises a Universal Mobile Telecommunications System (UMTS) network.

9. The method of claim 8, wherein the RNC identifier and the cell identifier respectively comprise RNCId and CellId in a UMTS Terrestrial Radio Access Network (UTRAN) cell identifier (UC-ID) parameter.

10. The method of claim 8, wherein the serving network node comprises a Node B.

11. An apparatus for processing requests to determine locations of mobile devices in a wireless network, the apparatus being shared by a plurality of radio access networks of the wireless network, the apparatus comprising:
    an interface module configured to receive a first positioning request message for a first mobile device from a first radio network controller in a first radio access network and to receive a second positioning request message for a second mobile device from a second radio network controller in a second radio access network;
    a retrieval module configured to retrieve a first originating point code (OPC) from call control signaling associated with the first positioning request message, the first positioning request message including a first cell identifier, and the OPC being unique to the first radio network controller;
    a determination module configured to determine a first mobile country code (MCC) and a first mobile network code (MNC) corresponding to the first radio network based on the first retrieved OPC; and
    a node identification module configured to identify a first network node serving the first mobile device based on the first cell identifier and the first determined MCC and MNC.

12. The apparatus of claim 11, wherein the retrieval module is further configured to retrieve a second OPC and a second cell identifier from the second positioning request message;
    wherein the determination module is further configured to determine a second MCC and a second MNC corresponding to the second radio network based on the second retrieved OPC; and wherein the node identification module is further configured to identify a second network node serving the second mobile device based on the second cell identifier and the second determined MCC and MNC.

13. The apparatus of claim 11, wherein the determination module determining the first MCC and the first MNC based on the retrieved first OPC comprises:
   previously mapping a plurality of OPCs to corresponding MCCs and MNCs;
   matching the retrieved first OPC to one of the plurality of mapped OPCs; and
   identifying the first MCC and the first MNC corresponding to the retrieved first OPC based on the previous mapping of the matched one of the plurality of mapped OPCs.

14. The apparatus of claim 13, the previously mapped plurality of OPCs comprise:
   a plurality of OPC ranges, each range comprising at least two of the plurality of OPCs, wherein each OPC range corresponds to an MCC and an MNC.

15. The apparatus of claim 14, wherein the determination module identifying the first MCC and the first MNC corresponding to the retrieved OPC comprises:
   associating the matched one of the plurality of mapped OPCs with an OPC range of the plurality of OPC ranges.

16. The apparatus of claim 13, wherein when the retrieved first OPC cannot be matched to one of the plurality of mapped OPCs, the determination module identifies a default MCC and MNC as the determined first MCC and MNC for identifying the first network node.

17. The apparatus of claim 12, wherein each of the first and second positioning request messages comprises a Positioning Calculation Application Part (PCAP) message.

18. The apparatus of claim 12, wherein each of the first and second OPCs comprises a signaling system 7 (SS7) address corresponding to the first and second radio network controllers, respectively.

19. The apparatus of claim 12, wherein the wireless network comprises a Universal Mobile Telecommunications System (UMTS) network, and each of the first and second cell identifiers comprises a UMTS Terrestrial Radio Access Network (UTRAN) cell identifier (UC-ID).

20. A non-transitory computer readable medium storing code executable by a computer processor for processing requests by a stand-alone serving mobile location center (SAS), shared by a plurality of radio access networks in a wireless network, to determine locations of mobile devices within the wireless network, the computer readable medium comprising:
   a retrieving code segment for retrieving an originating point code (OPC) from call control signaling associated with a positioning request message received from a first radio network controller in a first radio access network of the plurality of radio access networks, the OPC being unique to the first radio network controller among a plurality of radio network controllers in the plurality of radio access networks, the positioning request message corresponding to a mobile device;
   a determining code segment for determining a mobile country code (MCC) and a mobile network code (MNC) corresponding to the first radio access network based on the retrieved OPC; and
   an identifying code segment for identifying a serving network node communicating with the mobile device using the cell identifier and the determined MCC and MNC.

* * * * *